United States Patent [19]

Anderson et al.

[11] Patent Number: 4,908,923

[45] Date of Patent: Mar. 20, 1990

[54] METHOD OF DIMENSIONALLY STABILIZING INTERFACE BETWEEN DISSIMILAR METALS IN AN INTERNAL COMBUSTION ENGINE

[75] Inventors: Anthony T. Anderson, Romulus; David A. Donovan, Chelsea, both of Mich.

[73] Assignee: Ford Motor Company, Dearborn, Mich.

[21] Appl. No.: 253,469

[22] Filed: Oct. 5, 1988

[51] Int. Cl.$^4$ .............................................. B22D 19/00
[52] U.S. Cl. ................................. 29/888.01; 29/527.5; 29/888.046; 164/98; 164/103; 164/105
[58] Field of Search ..................... 29/156.4, 156.4 WL, 29/156.5 R, 156.5 A, 156.7 R, 156.8 R, 527.5; 164/97, 98, 103, 105; 123/210, 195 R; 419/5, 13, 14, 17, 24

[56] References Cited

U.S. PATENT DOCUMENTS

| | | |
|---|---|---|
| 3,089,735 | 5/1963 | Mann . |
| 3,276,082 | 10/1966 | Thomas ............................... 164/105 |
| 3,568,723 | 3/1971 | Sowards ............................... 164/98 |
| 3,794,100 | 2/1974 | Raymond et al. .................... 164/105 |
| 3,919,755 | 11/1975 | Kaneko et al. ............. 29/156.4 WL |
| 3,939,897 | 2/1976 | Kaneko et al. ....................... 164/103 |
| 4,450,800 | 5/1984 | Kotauschek ................. 123/193 CH |
| 4,534,400 | 8/1985 | Ban et al. ............................. 164/97 |
| 4,573,517 | 3/1986 | Booth et al. ......................... 164/105 |
| 4,587,177 | 5/1986 | Toaz et al. ........................... 428/610 |
| 4,631,793 | 12/1986 | Shintaku et al. ...................... 164/97 |
| 4,740,429 | 4/1988 | Tsuno .................................. 428/660 |
| 4,804,033 | 2/1989 | Hepworth et al. .................... 164/97 |
| 4,828,009 | 5/1989 | Taniguchi et al. .................... 164/98 |

FOREIGN PATENT DOCUMENTS 0230192 7/1987 European Pat. Off. .............. 164/98

OTHER PUBLICATIONS

"Aluminum Engines Require Special Gasketing Techniques", 1983 Society of Automotive Engineers, Inc., vol. 91, No. 4, pp. 48-50, Automotive Engineering.

Primary Examiner—Howard N. Goldberg
Assistant Examiner—Irene Cuda
Attorney, Agent, or Firm—Joseph W. Malleck; Roger L. May

[57] ABSTRACT

Method of dimensionally stabilizing the interface between metal parts of differing thermal expansion characteristics (TEC), regardless of temperature variations under normal designed use of such parts, comprising: (a) hot extruding a mixture of ceramic fibers (i.e., $Si_3N_4$, SiC, $Al_2O_3$) and a powder of the metal having the higher TEC (i.e., Al, Ti, Mg) while aligning the fibers generally along the direction of extrusion, to form an insert; (b) shaping the insert to align its fibers generally in at least one direction of anticipated thermal growth that may interfere with the interface; (c) casting the insert in place within a first part comprised of the higher TEC metal and with the insert's fibers (i) oriented as above, and (ii) preheated to a temperature no greater than 35-45% of the temperature of the molten light metal; and (d) bringing together the first metal part with a second part of lower TEC metal (i.e., Fe or steel) to form the interface. The insert may be located in a mold in a manner to be totally enveloped by the molten light metal with the insert having a surface spaced a uniform, predetermined distance from the exterior of the cast light metal part, or the insert may be located to expose a surface thereof upon completion of the casting.

22 Claims, 8 Drawing Sheets

FIG. 9  1.4X Magnification

FIG. 10  20X Magnification

Photographs of metallographic cross sections showing the excellent metallurgical bonding of the MMC insert with the cast aluminum main bearing.

Fig. 11

METHOD OF DIMENSIONALLY STABILIZING INTERFACE BETWEEN DISSIMILAR METALS IN AN INTERNAL COMBUSTION ENGINE

BACKGROUND OF THE INVENTION

1. Technical Field

This invention relates to the art of interfacing metals having differing thermal expansion characteristics and, more particularly, to the art of compensating for such differences in thermal expansion when such joined metals are used at widely varying temperature conditions.

2. Description of the Prior Art

In modern internal combustion engines, dissimilar metal interfaces have included both rigid and moving interfaces. A rigid interface exists between an aluminum head and an iron-based cylinder block, joined by steel bolts with a gasket interposed therebetween. Similarly, a rigid interface may exist between an aluminum cylinder block and cast-iron main bearing caps attached to the block by steel bolts. The coefficient of thermal expansion of the steel bolts, or of the cast-iron part, relative to the aluminum part, differs considerably and may result in widely differing clamping forces between the parts. The interface can loosen under some temperature conditions that may cause engine performance problems.

Attempts have been made to use gasket materials with excessively low relaxation rates at the rigid head-to-block interface and thereby maintain a more uniform level of bolt forces (see SAE article "Aluminum Engines Require Special Gasketing Techniques", Vol. 91, No. 4, pp. 48–50, 1983). Such techniques are expensive and not totally satisfactory to eliminate all leakage. Other attempts to improve rigid interfaces have included the use of inserts having high resistance to creep which have been cast-in-place in an aluminum head to avoid plastic deformation of the head under the stress of steel bolts (see U.S. Pat. No. 4,450,800). The insert in this disclosure is comprised of nickel and iron providing a coefficient of thermal expansion the same as the aluminum head but with greater pressure resistance than aluminum. This, in no way, modifies the thermal expansion characteristic of either interfacing part, thus resulting in the same propensity to looseness.

Moving interfaces exist between rotating members and their bearings or between a reciprocating piston and its bore walls. At the interface between an iron crankshaft and an aluminum bearing support, the prior art has attempted to modify the absorption of impact stress at such interface to eliminate gradual distortion of the support. In U.S. Pat. No. 3,089,735, a bearing support insert is used to provide a greater outer surface area than inner surface area. In this disclosure, a cast-in-place insert comprised of aluminum or magnesium is kneaded to have high compression resistance; it is preferably bonded during casting of the block by use of lead, cadmium, tin or zinc. No attempt is made to substantially modify the thermal expansion characteristic of the block at the interface by material substitution.

Although metal matrix composites are known which change the physical characteristics of the metal matrix by introducing a ceramic phase, little application research has been carried out to adapt such technology to dissimilar metal interfaces which may be employed in an internal combustion engine.

Accordingly, the primary goal of this invention is (i) to modify the thermal expansion characteristic of at least one part of an interface between dissimilar metals to make them dimensionally compatible at varying temperature conditions, and (ii) to do so by cast-in-place techniques that avoid the buildup of internal stresses that lead to breakage or delamination.

SUMMARY OF THE INVENTION

A primary aspect of this invention is a method of dimensionally stabilizing the interface between metal parts of differing thermal expansion characteristics or coefficients (TEC), regardless of temperature variations under normal designed use of such parts. The method comprises: (a) casting molten metal, for a first part having the higher TEC, about an insert consisting of (i) a metal matrix comprised of a metal substantially the same as the metal having the higher TEC, and (ii) ceramic fibers generally having a TEC substantially less than either of said parts, the fibers of the insert being generally aligned with at least one direction of anticipated thermal growth of the part having the higher TEC that may interfere with the interface, thereby to modify the TEC of the first part adjacent the interface; and (b) operatively assembling together the parts to form the interface. The casting step is desirably preceded by extruding a mixture of metal powder and ceramic fibers, the metal powder having a TEC similar to the metal part having the higher TEC.

The fibers are aligned generally along the direction of extrusion; the insert is taken from the extruded strand by severing and shaped, if necessary, to orient its fibers generally in-line with at least one direction of thermal growth that may interfere with the interface. The insert is located in a mold for being cast-in-place to carry out the predetermined fiber orientation; the insert is preheated to a temperature approximately 35–45% of the temperature of the molten metal of the higher TEC. The metal powder may be rapidly solidified and devoid of organic material. Advantageously, the thermal shock of the molten metal of higher TEC (introduced into the mold) will, upon contact with the insert, break up any oxide coating covering the molten metal to create improved wettability and bonding.

Preferably, the metal of the higher TEC is an aluminum alloy, thus permitting hot extrusion to be carried out using greater than 10:1 reduction, i.e., 30–50 ksi pressure, and at a temperature greater than 400° C., preferably 500°–600° C. The ceramic fibers may preferably be selected from the group consisting of silicon nitride, sialon, silicon carbide, aluminum silicate and alumina. The metal powder may be a metal form or alloy selected from the group consisting of aluminum, titanium, magnesium, copper, and zinc.

Advantageously, an insert for an aluminum metal part is shaped by heating to a temperature of about 300° C. for about 20 minutes and bending the insert to conform to the desired configuration. The insert may be arc-shaped and totally immersed as an embedment within a casting used for a rotating bearing support. Alternatively, the insert may be shaped as a cylinder to be deployed as a bushing and exposed at a rigid interfacing surface.

Preferably, the insert is molded to the cast metal part by die-casting techniques. When introducing molten metal, of an aluminum base, the pouring temperature is in the range of 750°–760° F. (398°–404° C.) with the insert being heated to a temperature in the range of 262°–342° F. (128°–172° C.).

Another aspect of this invention is the provision of a novel assembly for an internal combustion engine having interfacing metals of differing TEC, comprising: (a) a first part comprised of a metal having the lower TEC and presenting a first interface surface; (b) a second part comprised of a metal having the higher TEC and presenting a second interface surface to mate with the first interface surface, the second part having a cast-in-place metal matrix composite insert in which the metal matrix is comprised of substantially the same as the metal of said second part, said insert containing a ceramic phase consisting of ceramic fibers aligned generally in at least one direction of anticipated thermal growth of the first part that may interfere with the interface.

DETAILED DESCRIPTION AND BEST MODE

Interfacing metals of differing thermal expansion characteristics or coefficient (TEC), such as aluminum and iron, in an internal combustion engine may lead to poor performance. In rigid interfacings, such as when using metal fasteners to bolt together components with TEC significantly different than the fasteners, it is difficult to maintain a consistent clamping force between the components at varying temperature conditions. In moving interfaces, such as iron crankshafts in aluminum bearing supports, performance problems may result from the large difference of coefficient of thermal expansion. Cast iron has a TEC of about $6 \times 10^{-6}/°F$. or $12 \times 10^{-6}/°C$., and aluminum components have a TEC of about $13 \times 10^{-6}/°F$. or $21 \times 10^{-6}/°C$. A main bearing running clearance of 0.0008 inches diametrically is ideal for good engine performance at normal operating temperatures, but when the aluminum casting is cooled, it will contract too much around the iron crankshaft, decreasing the running clearance to a point where required cold weather starting ($-40°$ F.) becomes difficult. Likewise, in above normal or hot running engines, the running clearance can increase to the point where excessive noise and oil consumption will result.

To overcome these problems, this invention provides a method of deploying ceramic fiber oriented metal matrix composites as inserts in a cast component having the higher coefficient of thermal expansion and which will serve as one of the interfacing metal parts. The cast-in-place inserts will locally reduce the TEC, for the metal of normally higher TEC, at the interface, closer to that of the metal part having the lower TEC, thereby controlling the dimensional fit or running clearance variation to provide good, consistent engine performance.

Figure 1:
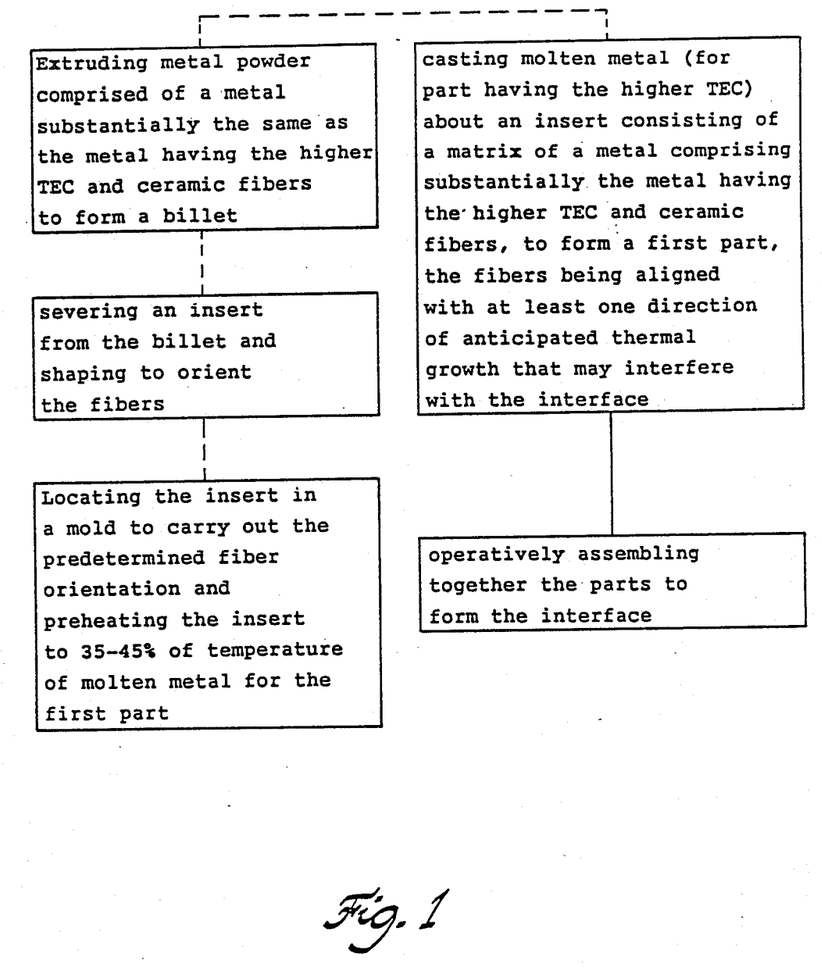
FIG. 1 is a flow diagram of the method steps of this invention.

The method of this invention can provide for dimensionally stabilizing, against the effects of temperature variations, the interfaces between metal parts of differing thermal expansion characteristics. This is carried out, as shown in FIG. 1, by primarily first casting molten metal (for a first part having the higher TEC) about an insert consisting of (i) a matrix of a metal comprised substantially of the metal having the higher TEC, and (ii) ceramic fibers, to form a first part. The fibers are aligned, during casting, to generally coincide with at least one direction of anticipated thermal growth that may interfere with the interface. Secondly, the parts are operatively assembled together to form the interface with the fibers oriented as predetermined. Steps preparatory to casting for making and locating the inserts include first the step of extruding the metal powder similar to the metal having the higher TEC and ceramic fibers to form a billet. Next, the billet is severed to provide an insert and shaping the insert, if necessary, to orient the fibers in a predetermined manner different than what is inherent in the billet. Lastly, locating the insert in a mold to carry out the predetermined fiber orientation, while preheating the insert to 35-45% of the temperature of the molten metal for the first part.

Dissimilar Metal Interfaces

Figure 2:
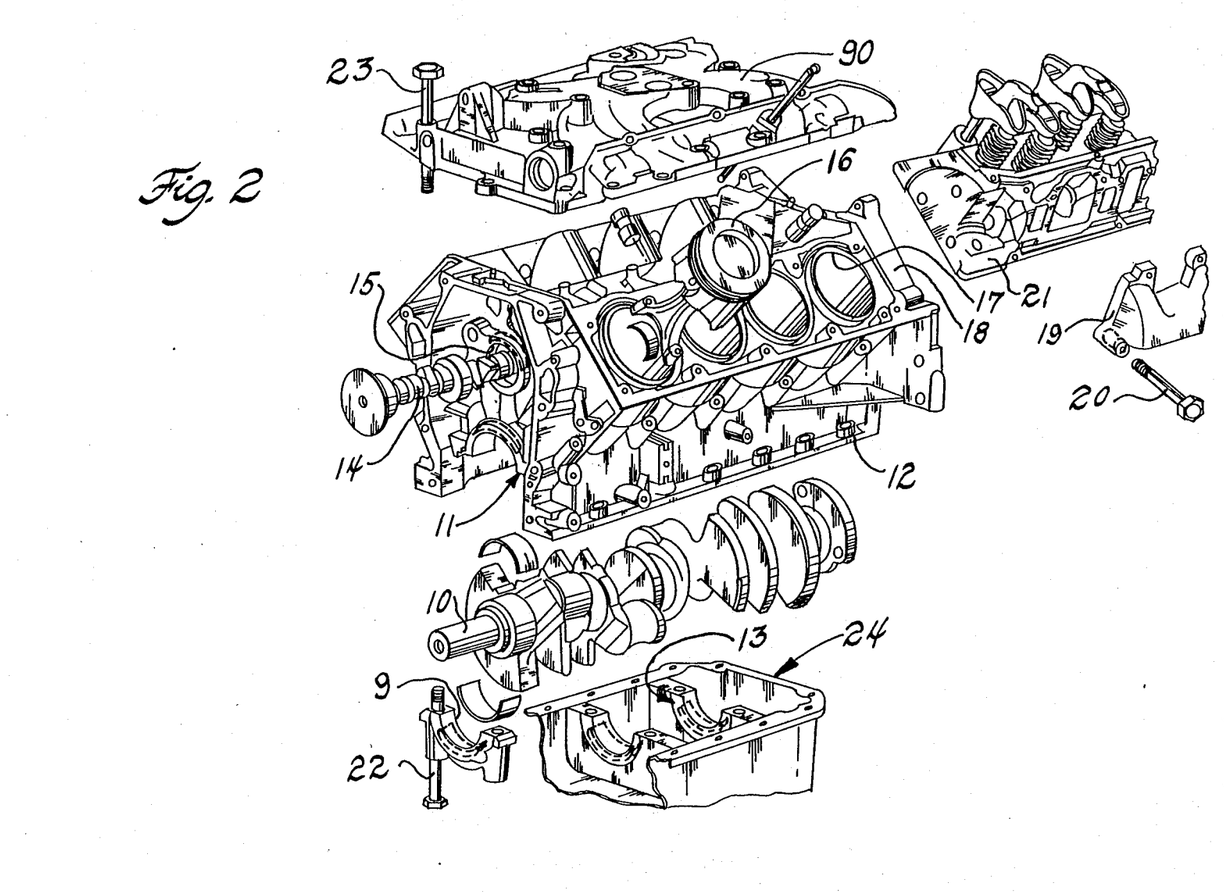
FIG. 2 is an exploded view of parts of an internal combustion engine showing locations for applying this invention within such engine.

In modern internal combustion engines there is now employed, at various locations throughout the engine, a mating of metals having dissimilar TEC, such as aluminum and cast-iron or steel. Other light metals such as titanium, magnesium, copper, and zinc may be employed which will have a high TEC. Other metals with low TEC may be employed, such as lead. FIG. 2 shows some examples of moving interfaces employing dissimilar metal, which include: (i) the support of a cast-iron crankshaft 10 by aluminum bearing supports 11 cast integral in an aluminum crankcase 12 and/or employing aluminum main bearing caps 13, preferably cast integral with an aluminum oil pan 24, (ii) rotary support of cast-iron camshaft 14 in integrally cast aluminum supports 15, (iii) a reciprocal or sliding interface between an aluminum piston 16 and iron liner 17 of a cylinder block 18, and (iv) the aluminum piston 16 riding directly against the cylinder bores of an iron block utilizing a ringless piston concept. Examples of rigid interfaces include: (i) a cast-iron exhaust manifold 19 fastened by steel bolts 20 to aluminum cylinder head 21, (ii) iron main bearing caps 9 fastened to an aluminum casting for cylinder block 18 by use of steel or iron-based threaded fasteners 22, and (iii) a cast aluminum intake manifold 9 fastened to an iron or aluminum cylinder block 18 by steel bolts 23. In the rigid interface examples, the iron-based fasteners will respond to temperature environments differently than the threaded support comprised of aluminum. This may lead to unusual stress patterns and eventual loosening of the fasteners within the threaded support.

Moving Interface Application

In a moving interface, such as a curved cylindrical surface about a rotatable shaft, the circumference of the interfacing surface of the parts with the higher TEC has to increase or grow at higher temperatures. Therefore, the direction to restrain is a curvilinear one, aligned with the circumference. Thermal growth in other directions perpendicular to such circumference has little effect on an interface of mating cylindrical surfaces. This is true also for a sliding interface, such as a cylindrical piston reciprocating against a cylindrical bore wall in a ringless piston application. In a three-dimensional interface, such as in a universal ball and socket interfit, it may be necessary to restrain thermal growth in two mutually perpendicular but circumferential directions; thus, the fibers must accordingly be aligned in both such directions.

Figure 3:
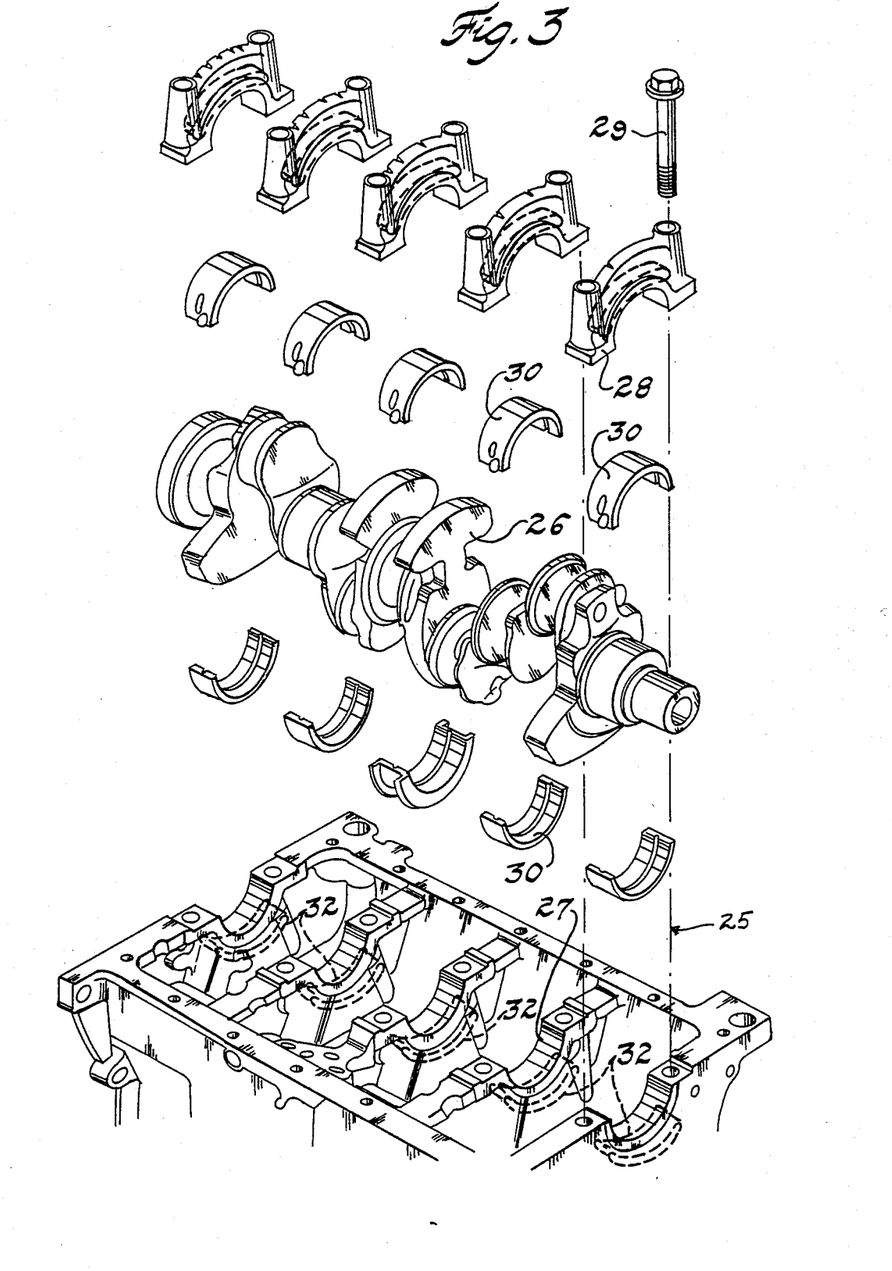
FIG. 3 is an enlarged perspective exploded view of the bottom of an aluminum cylinder block showing main bearing supports and bearing caps with cast-in-place inserts of this invention.
Figures 4, 5:
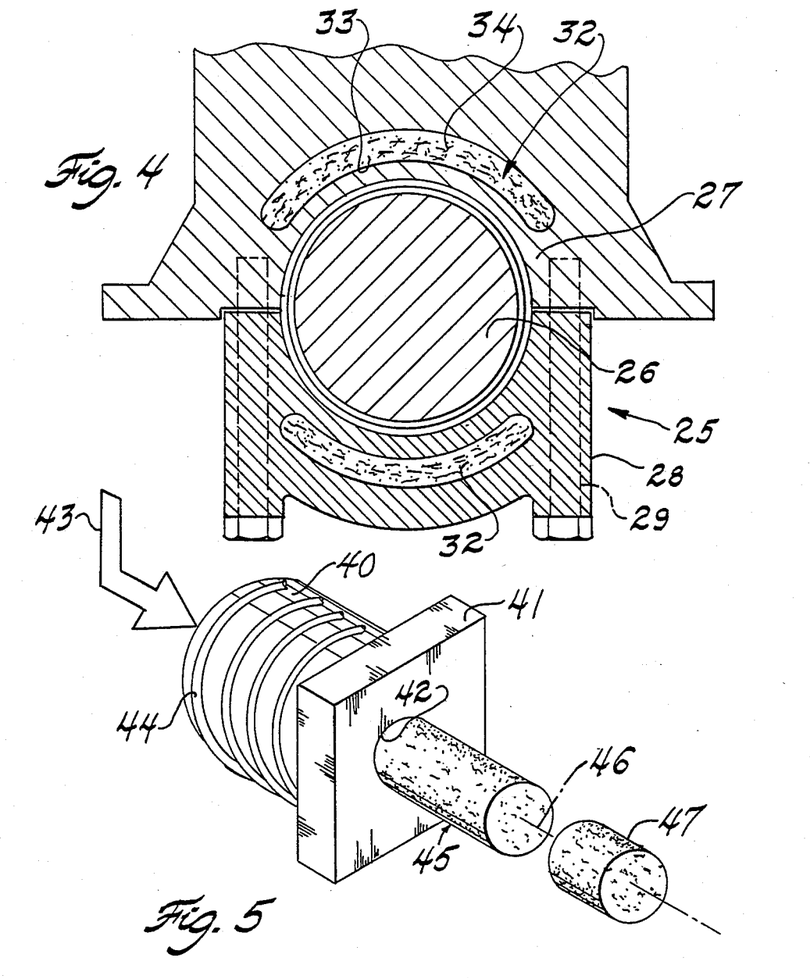
FIG. 4 is an enlarged sectional view taken centrally through one of the main bearings of FIG. 3 showing the use of totally immersed or embedded inserts to control thermal expansion for a moving interface application.
FIG. 5 shows schematically a mode for carrying out hot extrusion.

As shown in FIGS. 3–4, an assembly 25 is provided for supporting a first part 26 (comprised of a nodular iron crankshaft) within a second part or assembly 27–28 comprised of aluminum alloy die-cast bearing supports. One of the latter is a main bearing support 27 integrally cast with the aluminum alloy cylinder block, and the other is a main bearing cap 28 cast independently and secured to the main bearing support 27 by suitable threaded fasteners 29. An interface is created between the moving or rotatable first part 26 and the fixed second part 27–28, bringing them together with two half-shell bushing type bearings 30 interposed therebetween. The second part 27–28 will experience thermal growth in a three-dimensional mode, but the most critical direction is that which is along the circumference and annular interface.

To achieve dimensional stability of the interface, a metal matrix composite insert 32 is formed by compacting, hot extrusion, shaping, and then casting it in-place within each of the second parts 27–28. The insert modifies the rate of thermal expansion coefficient for the second part adjacent at the interface to provide dimensional stability in a temperature environment of minus 40° F. to 500° F. Such metal matrix composite insert is comprised of a matrix 33 consisting of rapidly solidified aluminum alloy powder and ceramic fibers 34 oriented in a predetermined manner. Preferably, the matrix metal is a aluminum alloy consisting of 8–15% (by weight) Si, 0.5–4.5% Cu, 0.05–0.7% Mg and the remainder Al. The powder is prealloyed and formed by inert gas atomization for rapid solidification.

Candidate fibers include sialon, silicon nitride, silicon carbide, aluminosilicates, and alumina. As shown in Table I, their coefficients of thermal expansion are, respectively, $3.0 \times 10^{-6}/°C.$, $3.3 \times 10^{-6}/°C.$, $4.3 \times 10^{-6}/°C.$, $5.1 \times 10^{-6}/°C.$, and $8.1 \times 10^{-6}/°C.$, each of which is smaller than that of the thermal coefficient of expansion for cast-iron. Also, each has a strength and modulus of elasticity which is high for supporting the stresses induced when restricting the thermal expansion of the aluminum alloy matrix during heating; this is important for engine bearing applications. By manipulating the content of the fiber versus the matrix, the resulting insert can be selectively tailored to have a coefficient of thermal expansion approach or equal that of cast-iron unidirectionally by controlling the volume percent fiber from 5% to 55%. Selection of ceramic fiber type, matrix alloy, and volume percent, the TEC can be adjusted to match the TEC of many other light metals having high TEC. For example, a blend of 20 volume percent SiC with 6061 rapidly solidified aluminum alloy yielded an insert TEC of $7/83 \; 10^{-6}/°F.$, also shown in Table I.

The metal matrix powder for the insert 33 is blended with the ceramic fibers and may be warm or cold pressed to form a green compact structure in preparation for hot extrusion. Full density is necessary to ensure the integrity of the article and attain the necessary mechanical properties for extrusion. Vacuum compaction or isostatic pressing at elevated temperatures and pressures to cure the green structure should not be used to achieve full density in the composite. High temperatures can cause an adverse reaction between the fibers and matrix metal, especially for silicon carbide fibers and reactive metals like aluminum and titanium. Such reaction affects the integrity of the composites and their mechanical properties. Secondary phases, such as carbides, borides, silicides or nitrides, can be formed in these reactive composites and are predictably based upon thermal dynamic considerations. Avoidance of an adverse reaction can be accomplished by plastically deforming the matrix metal to impart a significant strain energy to the metal, mixing the strain energized metal with the ceramic fibers (preferably having an aspect ratio (l/d) of 20–200). Strain energy can be imparted in a number of ways: one way is to pass spherical, prealloyed metal particles through opposed rolls. The strain energy stored in the metal allows subsequent extrusion to occur at lower temperatures so that adverse reactions do not occur between the fibers and the matrix metal. However, plastic deformation is not necessary for making green compacts of aluminum alloy metal and silicon nitride fibers since the alloys have relatively low melting points and are softer than other light metals such as titanium alloys. Even without imparting strain energy to the matrix metals, the processing temperatures can remain low enough that the alloy and silicon nitride fibers will not react and the fibers will not degrade.

Forming composites with continuous or very long fibers often requires highly specialized fabrication techniques to blend the fibers and to avoid (1) fiber breakage, (2) fiber bunching, (3) nonuniform fiber/matrix interfacial bonding, and (4) void concentrations. Semi-long whiskers or particulates are more readily used for hot extrusion of this invention. Agglomeration of the fibers should be avoided during blending; vibrating the mixture has proven as one means to achieve the desired dispersion. Machining, drilling, grinding, joining, and other operations are also more readily accomplished with composites having discrete or discontinuous fibers, since the properties of the composite are not as severely linked to the continuity of the fiber.

As shown in FIG. 5, the green body 40 is hot extruded by being passed through a die opening 42 of die 41 using a power feed 43. The reduction ratio of the hot extrusion process should be greater than 10:1. Extrusion is carried out at a temperature between 500°–600° C. at a pressure of 20–40 ksi for Al metal matrix composites; extrusion of titanium may be at a temperature of about 500°–700° C. and at a pressure of about 50 ksi. Such temperatures are achieved by use of an induction heater 44. The output of the die will be a continuous billet 45 having higher percent fiber orientation and greater unidirectional strength along its axis 46 than conventional powder metallurgy composites. Preferably, the extruded Al/SiC composite will have a tensile strength at room temperature of about 50 Kg/mm², a tensile strength at 200° C. of about 28 Kg/mm², and a compressive strength of about 6.5 Kg/mm².

Figure 6:
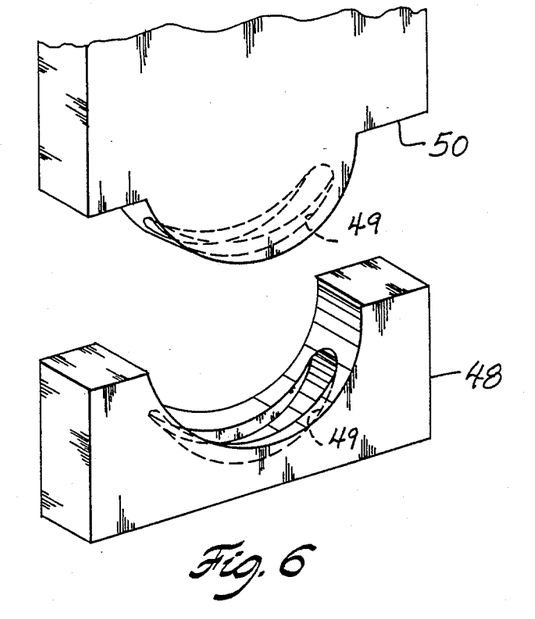
FIG. 6 is a perspective view of fixture parts used to shape an insert for a bearing cap application.

The billet is severed into discrete inserts 47 and then shaped to orient the fibers in a predetermined arcuate manner to maximize the resistance to the direction of circumferential thermal growth. To this end, the elongated insert 47 is placed in a crescent-shaped cavity 49 of a fixture 48, such as shown in FIG. 6. The material is preferably heated to a temperature of about 300° C. (760° F.) for a period of about 20 minutes and bent to the shape of the die cavity by use of the fixture 48 and an arc-shaped punch 50 (both heated to about 450° F. min.) having provision 51 for receiving part of the insert. The fibers will be aligned in a direction generally along the circumference of the interface for the part into which it is to be cast.

Figure 7:
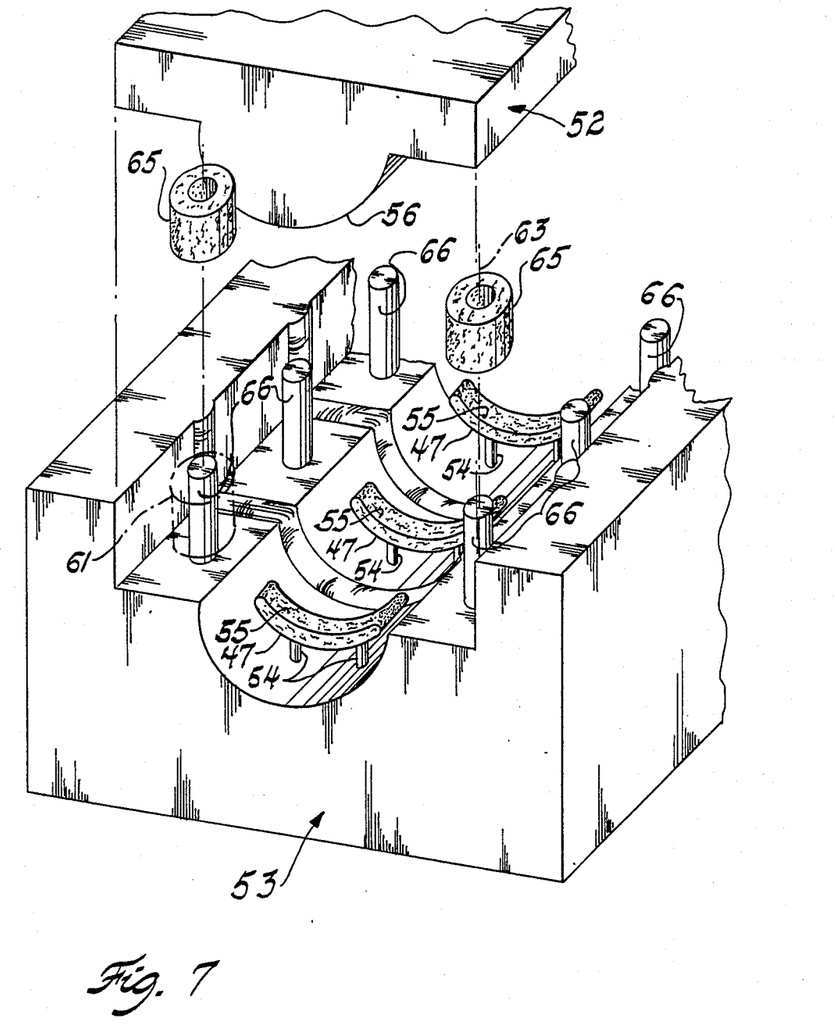
FIG. 7 is a perspective view showing a mold fixture and inserts for making both a moving interface an a rigid interface application.

To cast the arc-shaped inserts 47 in place within the aluminum crankcase supports or caps requires, firs, preheating the insert 47 to approximately 35–45% of the temperature of the molten metal used to make the casting. As shown in FIG. 7, the heated inserts 47 are transferred to a die-casting mold prior to the addition of the molten aluminum alloy. The mold has die parts consisting of a cope 52 and drag 53; the metal matrix composite inserts are positioned within the mold by the use of pegs 54. The insert are positioned so that their concave surface 55 will lie approximately 0.06–0.12 inches from the curved interface 56 of the light metal cast part. As the molten aluminum is poured into the mold, it surrounds the inserts; the molten metal is preferably poured at a temperature of 750°–760° F. Any protective alumina coating is broken up as a result of the stresses induced by the thermal shock created at the insert/molten metal confrontation. Breaking up the protective alumina coating on the insert surface improves the wetting at the interface and promotes an excellent bond to the casting when cooled.

Rigid Interface Application

Figure 8:
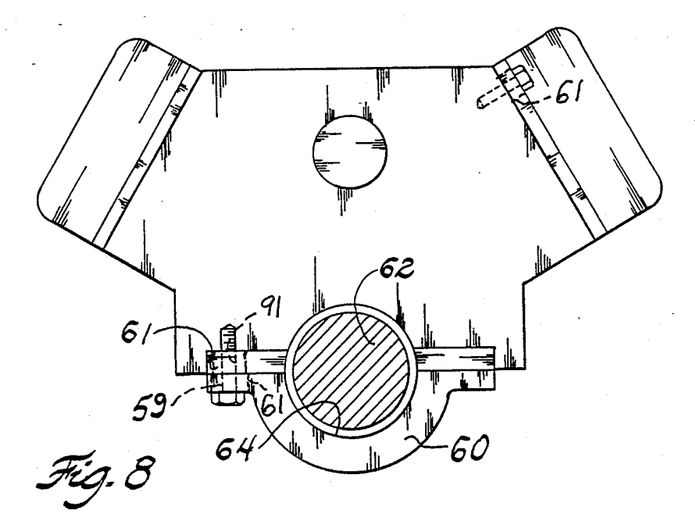
FIG. 8 is a schematic view, partially in section, of a block and aluminum head for an engine assembly showing rigid interface applications of the invention.

As shown in FIGS. 7 and 8, a rigid interface application is illustrated wherein steel bolts 59 are received through in a metal part 60 (of the higher TEC) having cast-in-place, sometimes internally threaded, cylindrical fiber reinforced inserts 61. Thermal expansion of the light metal bearing cap 60 may far exceed the thermal expansion of the steel bolts leading to a loosening of clamping pressure on the caps and distortion of the bearing surface 64 for the crankshaft 62. The cylindrical metal matrix composite inserts provide a solution to essentially a unidimensional thermal growth problem in this application; the inserts are exposed to the interface 91 with the heavy metal part.

In a rigid interface, dimensional stability must be obtained in a direction along the axis of fastener or bolt tension. Thermal growth in directions other than along such axis will not interfere with loosening of the bolt.

To carry out the method for this application, the same mixture, ceramic fibers and metal alloy powder, compaction pressures, and hot extrusion pressures are used for the making of the inserts. However, the extrusion is of a hollow cylinder with the fibers 65 oriented in a direction parallel to axis 63 of the cylinder. In this manner, the fibers will be generally parallel to the direction of anticipated thermal growth at the threaded interface which may interfere with bolt tension.

The cylindrical inserts 61 are each shaped by techniques to receive the steel bolts. The inserts are then placed in a mold, as shown in FIG. 7, on pins 66 for stationing the inserts with the fibers in a predetermined orientation in shoulders 68 of the light metal part. Preheating temperatures for the inserts and molten light metal temperatures are used as in the previous embodiment described. Upon solidification of the cast light metal part, it is brought together with the heavy metal part (steel bolt) by threadably securing the bolts through the bearing cap and support and through the threaded cylindrical inserts.

EXAMPLES

Iron, aluminum and composite aluminum metal matrix composite inserts were made into test castings and bolted together for testing. The metal matrix composite for these castings was comprised of 20 volume percent SiC in a 6061 rapidly solidified Al powder. The bore diameters of all three assemblies were measured as a function of temperature over the range from $-40°$ to $-400°$ F. A telescoping gauge was used to measure the bore diameter at three orientations. From these measurements, the mean bore diameter for each temperature was calculated. This information was then used to determine (for each material): the diametrical strain, the TEC, and an estimate of the main bearing/crankshaft running clearances at temperature ranging from $-40°$ F. to 300° F. (see Table II).

Figure 11:
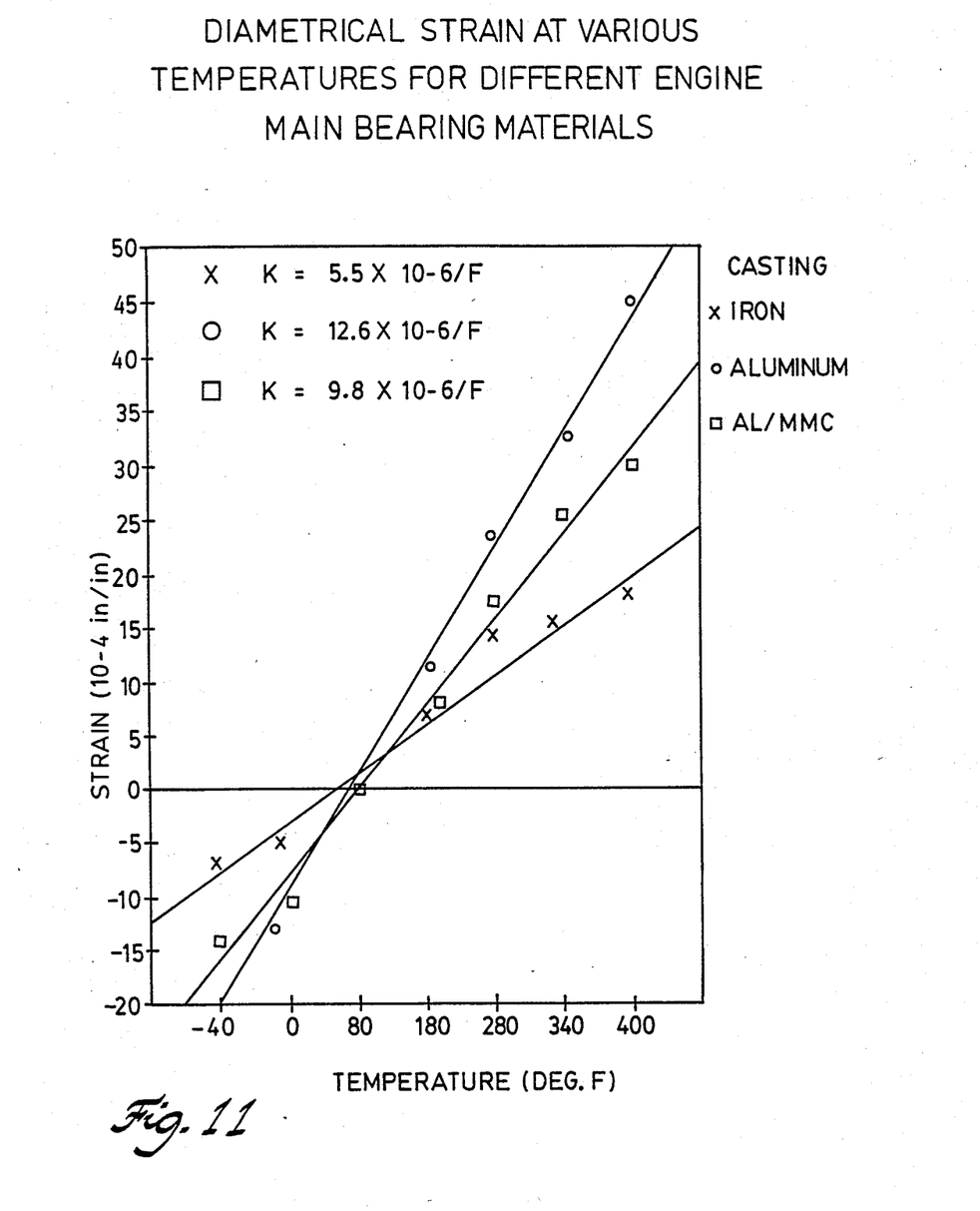
FIG. 11 is a graphical illustration of strain at various temperatures for different engine bearing materials.

A summary of the diametrical strain variations of the test assembly bores as a result of temperature changes is shown in FIG. 11. The lines through the data points were determined with linear regression analysis and the slope of each line represents the TEC at the bored holes for each of the assemblies. The TEC for both the all-iron and all-aluminum assemblies determined in these example agree well with published values. As shown, the cast-in-place MMC inserts with SiC were effective in reducing the thermal expansion coefficient of cast aluminum to a value about midway between that of cast aluminum and cast iron.

In Table II, and as shown for an iron crankshaft with iron bearing caps, the clearance range will not change with temperature because the thermal expansion is the same. However, calculations show that when cast aluminum bearing caps or girdles are used, seizure of the crankshaft may occur at $-40°$ F. At the higher engine operating temperatures, the clearances are considered excessive (both minimum and maximum values) and will probably result in a noisy engine and excessive oil consumption at the main bearings. By adding the cast-in-place MMC inserts (20% SiC) to the casting aluminum bearing caps, calculations indicate that the main bearing clearance variations will be reduced substantially. With clearance tolerances in the specified range at room temperature, it should be possible to crank the engine at $-40°$ F. However, at higher engine temperatures the clearances will be higher than that for cast iron engines with iron bearing caps, but approximately the same as for aluminum engines with iron bearing caps.

To obtain a lower TEC than that of the 20% SiC material, a fiber with lower TEC than SiC is selected and combined with a higher fiber loading in the matrix. A review of possible reinforcing fibers (Table I) shows that silicon nitride and sialon are useful. Assuming that the maximum theoretical loading of $-50\%$ can be achieved, calculations based on the law of mixtures show that the TEC at the bored hole will be approximately $6.7 \times 10^{-6}/°F.$, which approaches that of iron ($6.2 \times 10^{-6}/°F$.) The crankshaft/main bearing clearances will be equivalent to that of cast iron.

Figure 9:
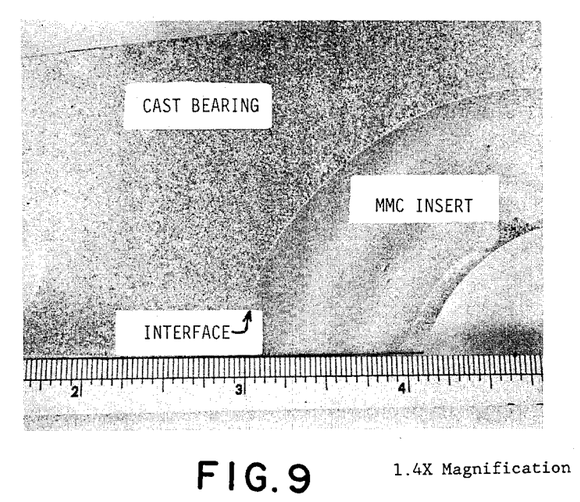
FIGS. 9 and 10 are photographs at different magnifications of metallograpic cross-sections for the structure of FIG. 3 showing the bonding of the insert to the cast part.
Figure 10:
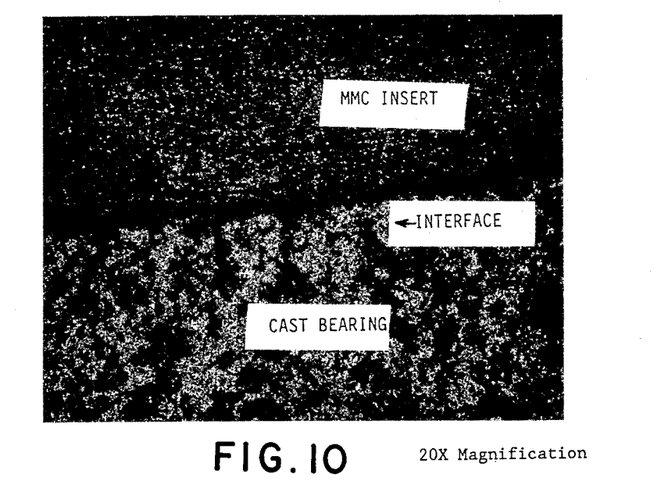

It is important to have a good metallurgical bond between the MMC insert and the aluminum casting for maximum long-term durability, especially when the engine is routinely operated over a wide temperature range. As shown by metallographic cross-sections (FIGS. 9 and 10), the bonding of this insert material to the cast aluminum parts was excellent. The MMC/aluminum casting interface showed no evidence of voids or lack of bonding on any of the parts.

While particular embodiments of the invention have been illustrated and described, it will be obvious to those skilled in the art that various changes and modifications may be made without departing from the invention, and it is intended to cover in the appended claims all such changes and equivalents as fall within the true spirit and scope of the invention.

TABLE I
THERMAL EXPANSION COEFFICIENT OF SELECTED MATERIALS AND FIBERS

| MATERIAL | THERMAL EXPANSION COEFFICIENT | |
|---|---|---|
| | $\times 10^{-6}/°F.$ | $\times 10^{-6}/°C.$ |
| Sialon Fiber | 1.66 | 3.0 |
| Silicon Nitride Fiber | 1.83 | 3.3 |
| Silicon Carbide Fiber | 2.39 | 4.3 |
| Aluminosilicate Fiber | 2.83 | 5.1 |
| Alumina Fiber | 4.50 | 8.1 |
| Aluminum | 14.0 | |
| 20% vol. % SiC fibers in rapidly solidified Al matrix | 7.83 | |
| 50 vol. % $Si_3N_4$ fibers in rapidly solidified Al matrix | 6.7 | |
| Nodular Cast Iron | 6.0 | |

TABLE II
MAIN BEARING/CRANKSHAFT JOURNAL RUNNING CLEARANCES FOR DIFFERENT BEARING MATERIALS AROUND A CAST IRON CRANKSHAFT

| MAIN BEARING MATERIAL | RUNNING CLEARANCES ($\times 10^{-3}$ in.) | | |
|---|---|---|---|
| | $-40°$ F. | TEMPERATURE ROOM | 300° F. |
| IRON | 1.8 | 1.8 min | 1.8 |
| | 2.6 | 2.6 max | 2.6 |
| ALUMINUM | −0.2 | 1.8 min | 5.5 |
| | 0.6 | 2.6 max | 6.3 |
| AL/MMC* | 0.6 | 1.8 min | 3.9 |
| | 1.4 | 2.6 max | 4.7 |
| AL/MMC** | 1.6 min | 1.8 min | 2.3 |
| | 2.4 max | 2.6 max | 3.1 |
| Upper half AL - IRON CAP | 0.8 | 1.8 | 3.6 |
| | 1.6 | 2.6 | 4.5 |
| Upper half AL/MMC - IRON CAP | 1.2 | 1.8 | 2.9 |
| | 2.0 | 2.6 | 3.7 |
| Upper Half AL/MMC** - IRON CAP | 1.6 | 1.8 | 2.1 |
| | 2.4 | 2.6 | 2.9 |

*Composite with 20 vol. % SiC in RS/AL matrix; TEC value of $7.83 \times 10^{-6}/°F.$
**Composite with 50 vol. % $Si_3N_4$ or sialon fibers in Al matrix; TEC value ($6.7 \times 10^{-6}/°F.$).

What is claimed:

1. Method of dimensionally stabilizing the interface between metal parts of differing thermal expansion characteristics (TEC), regardless of temperature variations under normal designed use of such parts, comprising:

(a) casting molten metal, for a first part having the higher TEC, about an insert consisting of (i) a metal matrix comprised a metal substantially the same as the metal having the higher TEC, and (ii) ceramic fibers generally having a TEC substantially less than either of said parts, the fibers of said insert being generally aligned with at least one direction of anticipated thermal growth of the part having the higher TEC that may interfere with said interface thereby to modify the TEC of said first part adjacent said interface; and (b) operatively assembling together said parts to form said interface.

2. The method as in claim 1, in which said parts provide for a moving interface between cylindrical surfaces, and said ceramic fibers are aligned to resist circumferential thermal growth about the interface of the part having the higher TEC.

3. The method as in claim 1, in which said parts have a rigid interface to provide a clamping force along one direction, and said ceramic fibers are aligned to resist thermal growth along said one direction.

4. Method of dimensionally stabilizing the interface between metal parts of differing thermal expansion characteristics (TEC), regardless of temperature variations under normal designed use of such parts, comprising:

(a) extruding a mixture of ceramic fibers and metal powder having a TEC similar to the part having the higher TEC to form an insert with said fibers aligned in a preferred orientation;

(b) casting said insert in place within a first part comprised of a metal having the higher TEC while locating the fibers' orientation of said insert to resist anticipated thermal growth at said interface; and (c) bringing together said first part with its insert and a second metal part having the lower TEC to form said interface.

5. The method as in claim 4, in which step (a) is carried out while aligning the fibers, generally along the direction of extrusion, to form such insert.

6. The method as in claim 5, in which in step (b) said insert's fibers are preheated to a temperature no greater than 35–45% of the temperature of the molten metal for the first part.

7. The method as in claim 4, which further includes the interposition, between steps (a) and (b), of the following step: shaping said insert to orient its fibers generally parallel to at least one direction of anticipated thermal growth at the interface.

8. The method as in claim 1, in which during step (b) said insert is located in a mold in a manner to be totally enveloped by the molten metal with the insert having a surface spaced a uniform, predetermined distance from the exterior of the metal part having the higher TEC.

9. The method as in claim 1, in which during step (b) said insert is located in a mold in a manner to have a surface exposed upon completion of the light metal casting with the exposed surface coterminous with the exterior of the casting.

10. The method as in claim 4, in which the TEC of said ceramic fibers is substantially less than the TEC of the metal of both said first and second parts.

11. The method as in claim 4, in which said mixture is essentially devoid of organic material.

12. Method of dimensionally stabilizing the interface between metal parts of differing thermal expansion characteristics (TEC), regardless of temperature variations under normal designed use of such parts, comprising:
 (a) hot extruding a mixture of ceramic fibers and rapidly solidified metal powder comprised substantially of the metal having the higher TEC, while aligning the fibers generally along the direction of extrusion, to form a billet;
 (b) severing an insert from the billet and shaping such insert to orient its fibers generally parallel to at least one direction of anticipated thermal growth that would interfere with said interface;
 (c) locating said insert in a mold for casting in place such insert in a first part comprised of the higher TEC metal, said insert being positioned to carry out said orientation of step (b), said insert being preheated to a temperature in the range of 35–45% of the temperature of the molten metal for the first part to be poured into the mold;
 (d) introducing molten metal for such first part into the mold whereupon the thermal shock of the molten metal upon contact with the insert breaks up any oxide coating covering the molten metal to create improved wettability and bonding between the insert and the light metal cast part; and
 (e) bringing together said first part with the second metal part, having the lower TEC metal, for forming said interface.

13. The method as in claim 12, in which said metal for said first par and powder is a metal or alloy thereof selected from the group consisting of aluminum, magnesium, titanium and copper.

14. The method as in claim 12, in which said ceramic fibers are selected from the group consisting of silicon nitride, sialon, silicon carbide, aluminum silicate and alumina.

15. The method as in claim 12, in which said metal for said first part is aluminum or aluminum alloy and step (a) is carried out using greater than 10:1 reduction and an extrusion temperature greater than 400° C.

16. The method as in claim 12, in which in step (b) said insert is shaped by heating to a temperature of about 300° C. for about 20 minutes while punching the insert to the desired shape.

17. The method as in claim 12, in which in step (c) said insert is located to be embedded within the casting at a distance of 0.06–0.12 inches from the surface of said casting.

18. The method as in claim 12, in which said insert is positioned in the mold in step (c) to have a surface coincident with the surface of the casting and thereby be exposed.

19. The method as in claim 12, in which step (d) is carried out by the use of die-casting techniques.

20. Method of dimensionally stabilizing the interface between aluminum-based automotive parts and iron-based automotive parts, comprising:
 (a) casting molten aluminum-based metal about an insert consisting of such aluminum-based metal and ceramic fibers to form a first part by (i) prior orientation of the ceramic fibers of the insert to be generally aligned with at least one direction of anticipated thermal growth of said aluminum-based part that may interfere with aid interface, and (ii) preheating said insert to a temperature no greater than 35–45% of the temperature of said molten aluminum-based metal; and
 (b) operatively assembling together said first part with an iron-based second part to form said interface.

21. The method as in claim 20, in which said insert in step (a)(i) is shaped as a cylinder and said iron-based part is a threaded fastener threadably received by said cylindrical insert.

22. The method as in claim 20, in which said insert in step (a)(i) is arc-shaped for nonexposed embedment within the aluminum-based part generally uniformly spaced from the interface.

* * * * *